UNITED STATES PATENT OFFICE.

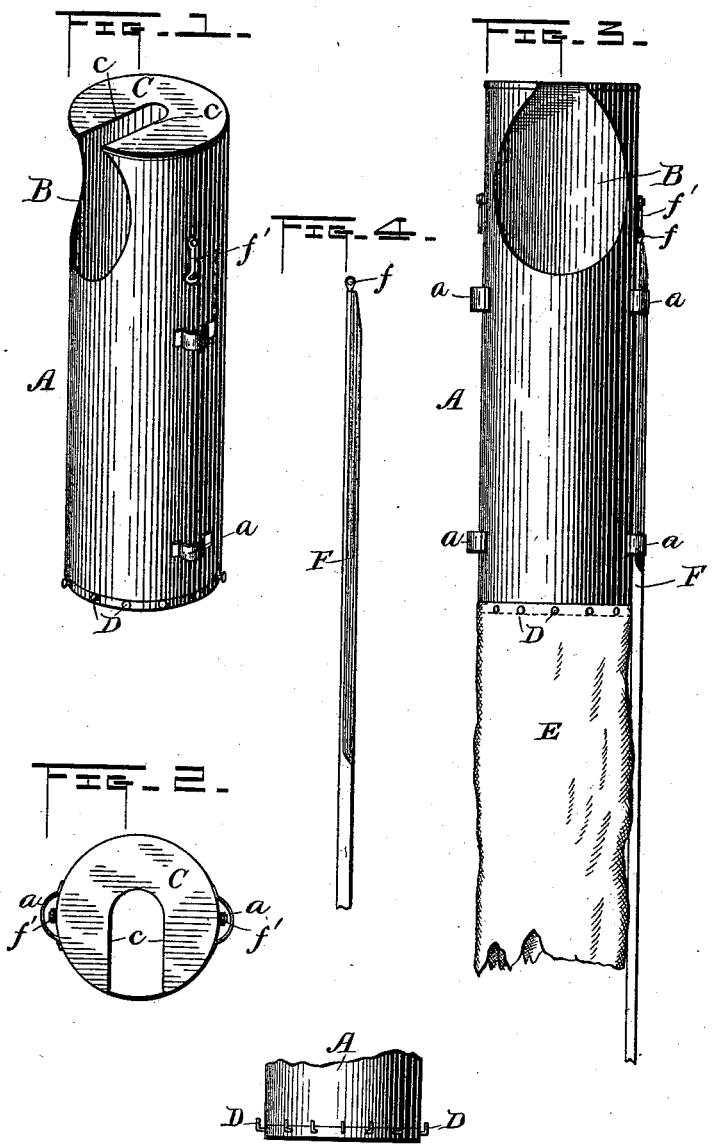

JOHN B. CATHER, OF FLEMINGTON, WEST VIRGINIA.

FRUIT-GATHERER.

SPECIFICATION forming part of Letters Patent No. 393,209, dated November 20, 1888.

Application filed June 16, 1888. Serial No. 277,285. (No model.)

*To all whom it may concern:*

Be it known that I, JOHN B. CATHER, a citizen of the United States, residing at Flemington, in the county of Taylor and State of West Virginia, have invented certain new and useful Improvements in Fruit-Pickers; and I do hereby declare the following to be a full, clear, and exact description of the invention, such as will enable others skilled in the art to which it appertains to make and use the same.

Figure 1 is a perspective view showing the present invention without the bag or handle. Fig. 2 is a top plan view of the cylinder; Fig. 3, a front elevation of the complete device; Fig. 4, a detached view of the handle. Fig. 5 is a detail to show hooks on the lower end of the cylinder.

This invention belongs to that class of devices known as "fruit-pickers;" and the novelty consists in the peculiar structure of the body of the device, in the means for attaching the handle to the body of the picker, and in the general construction and combination of the several parts of the device, all as will now be more particularly described, and pointed out in the claims.

Heretofore devices of this general description have been made having a conical top, and an opening or hole in the side of the cylindrical body near the top, and having a handle attached to one side and a bag at the lower end; but the difficulties in the use of such a device are many and the cost of it quite large. By having the opening at the side to get the fruit inside in order to pull it the picker has to be manipulated with great care, and generally held at an incline. If held vertically, in the attempt to get the fruit into the opening the metal was frequently brought so violently against the fruit as to bruise and thus cause serious injury to it. Indeed this result often happens, anyhow, in using said device. There has also been used a fruit-picker having an opening at its upper end with a serrated upper edge; but this device will not permit of a vertical and directly-downward pull, because the said serrated edge comes on one side of the fruit. Thus it happens that the pressure on the fruit is unequal and the tendency is to hurt it, also to project it inside and against the side of the picker and bruise one side of it; but my invention has this radical difference over any other—the pressure or pull upon the fruit is perfectly even and directly downward.

The easiest method of using it is to place the picker directly under the fruit, which is done without the least trouble, and in this position its opening is in the best possible position for the reception of the fruit. Then a slight vertical pull, in distinction from the crosswise or wrenching pull, as by the inventions heretofore in use, is always sufficient to detach the fruit from the tree with its stem intact and its body perfectly sound. No difficulty whatever is found in reaching the fruit by my device.

Having now generally stated the objects and uses of my device, I will explain its construction and operation, reference being had to the accompanying drawings, in which—

A denotes a cylinder, of sheet metal, forming the body of the picker, which has sides parallel, or nearly so. In its side, in the upper part, is an opening, B, curvilinear in shape and extending with reduced size into the top C, where it has right lines at the sides $c$ $c$ and rounded end. The part of this opening in front is of a size amply large for any tree-fruit—such as apples, pears, peaches, and the like—to enter, while at the top part it is reduced so as to accommodate the stem of the fruit, and the sides $c$ $c$ of the top will press evenly and without damage directly upon the top part of the fruit.

At the lower end of the cylinder are hooks or buttons D, by which the bag E may be attached readily and securely, or as easily be detached therefrom when it is found necessary.

It is obvious that the bag can be tied on or otherwise secured to the lower end of the cylinder, if desired.

The handle F has an eye or ring, $f$, at its upper end. When the handle is placed in the sockets $a$ $a$ on the side of the cylinder A, it can be held there fast by means of the hook $f'$ on the side of the cylinder, which engages with said eye. Thus the handle will not be detached from the cylinder by reason of any severity of pull on the handle.

The device is very simple in structure, as will be noticed from the above description, and not at all costly.

The method of its operation will be readily understood from the foregoing description.

What I claim is—

1. A fruit-picker consisting of a metallic cylinder having a flat top and an opening in the side and top, the side portion of said opening being the broadest, whereby the fruit may be brought within the cylinder and detached from the tree by a direct pull, substantially as described.

2. The fruit-picker herein described, consisting of a metal cylinder having a flat top and an opening in its side and top, broad in front and narrower in the top, as described, and at its lower end provided with devices upon which the bag can be secured, substantially as set forth.

3. The fruit-picker A, having socket $a$ on its side, and an opening, B, in its side and top, broad in front and narrower in the top, and buttons D on its lower end, and a bag, E, secured thereon, and a hook, $f'$, on its side, and a handle, F, passing through the sockets, having eye $f$, engaged by the hook, substantially as described.

In testimony whereof I affix my signature in presence of two witnesses.

JOHN B. CATHER.

Witnesses:
 H. R. HENDRICKSON,
 W. E. SMITH.